United States Patent [19]
Genack

[11] Patent Number: 6,119,528
[45] Date of Patent: Sep. 19, 2000

[54] SYSTEM FOR MEASURING LIQUID FLOW THROUGH A METERING DEVICE

[75] Inventor: Thomas Genack, Milwaukee, Wis.

[73] Assignee: Lake Monitors, Inc, Milwaukee, Wis.

[21] Appl. No.: 09/363,791

[22] Filed: Jul. 29, 1999

[51] Int. Cl.[7] ................................. G01F 1/58; G01F 1/22
[52] U.S. Cl. ..................................... 73/861.12; 73/861.55
[58] Field of Search ............................ 73/861.12, 861.08, 73/861.18, 861.23, 861.52, 861.53, 861.55, 861.56, 861.58, 861.04, 198, 290 V

[56] References Cited

U.S. PATENT DOCUMENTS

| | | |
|---|---|---|
| 2,814,200 | 11/1957 | Hills . |
| 3,040,573 | 6/1962 | Berck . |
| 3,299,704 | 1/1967 | Wilson . |
| 3,404,567 | 10/1968 | Berck . |
| 4,487,077 | 12/1984 | Lake ..................................... 73/861.58 |
| 4,904,944 | 2/1990 | Dechene et al. ..................... 73/861.08 |
| 4,949,577 | 8/1990 | Schnitzler . |
| 4,986,133 | 1/1991 | Lake ..................................... 73/861.58 |
| 5,155,472 | 10/1992 | Dam ..................................... 73/290 V |
| 5,333,498 | 8/1994 | Brackett et al. ........................... 73/198 |
| 5,428,984 | 7/1995 | Jones et al. ............................. 73/290 V |
| 5,639,965 | 6/1997 | Meyer . |

OTHER PUBLICATIONS

Weigh–Tronix, Inc., Fairmont, MN, IMP–24 A Little Printer for Big Jobs (brochure), 2 pages.
Lake Monitors, Inc., Milwaukee, WI, R/T100 Digital Flow Analyzers (www.execpc.com/~lakemon/we02009.html) (1996).
Lake Monitors, Inc., Milwaukee, WI, R100 & RT/100 Digital Flow Analyzers (www.lakemonitors.com/we02000.html) (1997).

*Primary Examiner*—William Oen
*Assistant Examiner*—Jagdish Patel
*Attorney, Agent, or Firm*—Godfrey & Kahn, S.C.

[57] ABSTRACT

A system is provided that accurately measures the quantity of liquid that is transferred through a flow meter. The system is composed of a flow meter with an ultrasonic fluid (liquid) sensor mounted therein that operates to sense the presence or absence of liquid flowing through the flow meter so that air flow is not erroneously measured as liquid flow. When there is substantially no liquid flow through the meter, the ultrasonic fluid (liquid) sensor interrupts the transmission of an output signal from a signal-conditioning circuit to a totalizer that operates to process the signal and total the amount of liquid so that any non-liquid material passing through the meter is not included in the total amount of removed liquid by the totalizer. Also provided are methods of using the system to accurately measure the amount of liquid flowing through a flow meter, such as in a grease trap pumping operation.

12 Claims, 12 Drawing Sheets

SYSTEM FOR MEASURING LIQUID FLOW THROUGH A METERING DEVICE

FIELD OF THE INVENTION

This application relates to a system used to measure the amount of liquid flow through a metering system. More particularly, the invention relates to an electronic metering system for accurately and reliably measuring the amount of grease or other liquid flowing through a flow meter.

BACKGROUND OF THE INVENTION

Liquid waste management including grease trap pumping, has become a lucrative business. With the growth of the recycling industry, waste grease is now a commodity, and restaurants no longer pay for grease removal services. Rather, recyclers pay for waste grease, and recondition and sell it.

A grease trap pumping operation typically involves a tanker truck with a large hose that is inserted into the grease trap of the restaurant or other establishment. The grease is vacuumed out of the trap and through a metering device that measures the amount of grease that is removed. The removal service pays the establishment based on the total amount of grease that is registered through the meter.

There have been continuing problems in providing an accurate measurement of the total amount of grease that is removed. In particular, there is a period of time in the beginning of the removal operation when the vacuum is first started and at the end when the grease trap becomes empty, that air is pulled through the metering device and is erroneously measured as liquid. This gives a false reading of the total amount of grease that is removed, at a substantial cost to the removal service.

Metering devices directed toward solving this problem have had limited success. Several of these devices include air eliminator mechanisms. For example, U.S. Pat. No. 3,299,704 (Wilson) discloses an apparatus that includes a by-pass to remove gas from the system and prevent liquid flow through the meter when gas accumulates to a certain level. U.S. Pat. No. 3,404,567 (Berck) discloses an apparatus for channeling air through a by-pass line around the fluid meter. U.S. Pat. No. 4,949,577 (Schnitzler) discloses a metering assembly that includes an air eliminator vessel where air is eliminated through a vent tube.

Other devices are constructed to interrupt the flow of fluid through the meter. One such device, disclosed in U.S. Pat. No. 2,814,200 (Hills), includes an air flow check device that prevents activation of a liquid flow meter by air flow. The float-activated valve is constructed to vent air that is entrapped in the system. In another system disclosed in U.S. Pat. No. 3,040,573 (Berck), the air to liquid ratio of the fluid being forced into the flow line is detected, and a signal is produced to operate valves to control the flow of fluid through the meter.

Therefore, an object of the invention is to provide liquid measurement system that overcomes the disadvantages of current metering systems to accurately and reliably measure the amount of waste grease or other liquid material that is passed through a metering device from a container to a receptacle or other location.

SUMMARY OF THE INVENTION

These and other objects are achieved by the present invention, which provides a liquid measurement system, and methods of using the system to accurately measure the amount of liquid flowing through a flow meter.

The system is designed to measure the amount of grease or other liquid material pumped from a containment structure such as a grease trap at a restaurant to a receptacle such as a holding tank of a truck. The system is used in conjunction with a vacuum source to suction the liquid material out of the containment structure, and is equipped with a flow meter assembly that measures the flow of liquid therethrough.

The flow meter includes a fluid (liquid) sensor with a signaling element that is operable to sense the presence or absence of liquid flowing through the flow meter so that air flow will not be erroneously registered and measured as liquid flow. The fluid sensor controls the transmission of an output signal from the signal-conditioning circuit to a mechanism operable to process this signal and total the amount of liquid that has passed through the meter. When there is substantially no liquid passing through the meter, the fluid sensor interrupts power to the signal-conditioning circuit so that no output signal is sent to the totalizer.

The present system is useful in monitoring the amount of liquid removed in such operations as grease trap pumping, septic tank and sewer pumping, used oil reclamation, bulk liquid waste removal, among others. The present system significantly increases the accuracy of the measurement of the amount of liquid flowing through the flow meter compared to conventional systems based on optical or mechanical devices to separate and/or discern between liquid and air flow. The present system electronically discerns the flow of liquid from the flow of air to provide an accurate and reliable system to measure only the liquid component flowing through the meter.

BRIEF DESCRIPTION OF THE DRAWINGS

Throughout the following views, reference numerals will be used on the drawings, and the same reference numerals will be used throughout the several views and in the description to indicate same or like parts of the invention.

DETAILED DESCRIPTION OF THE INVENTION

Figure 1:
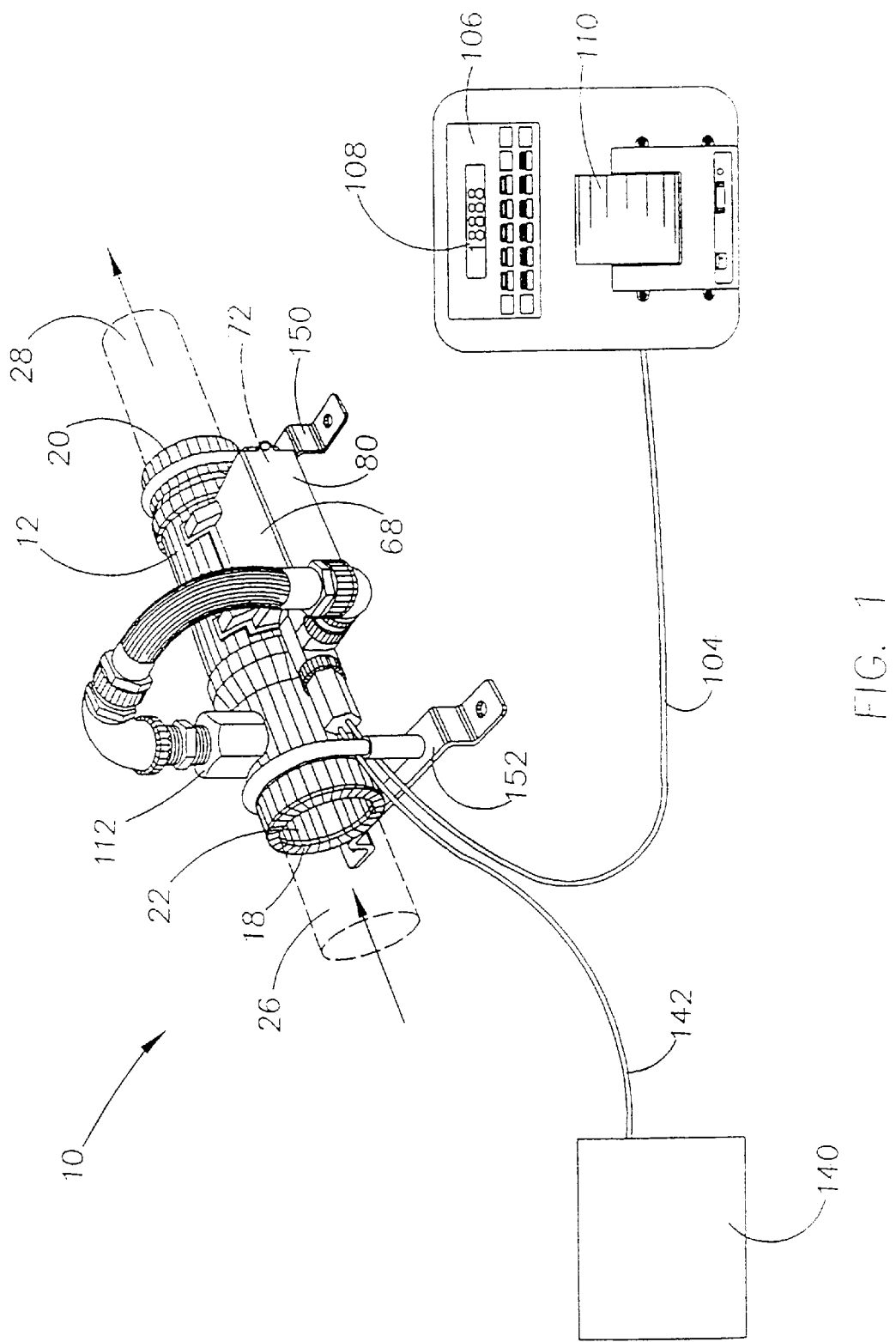
FIG. 1 is a perspective view of an embodiment of a liquid measurement system according to the present invention.
Figure 2:
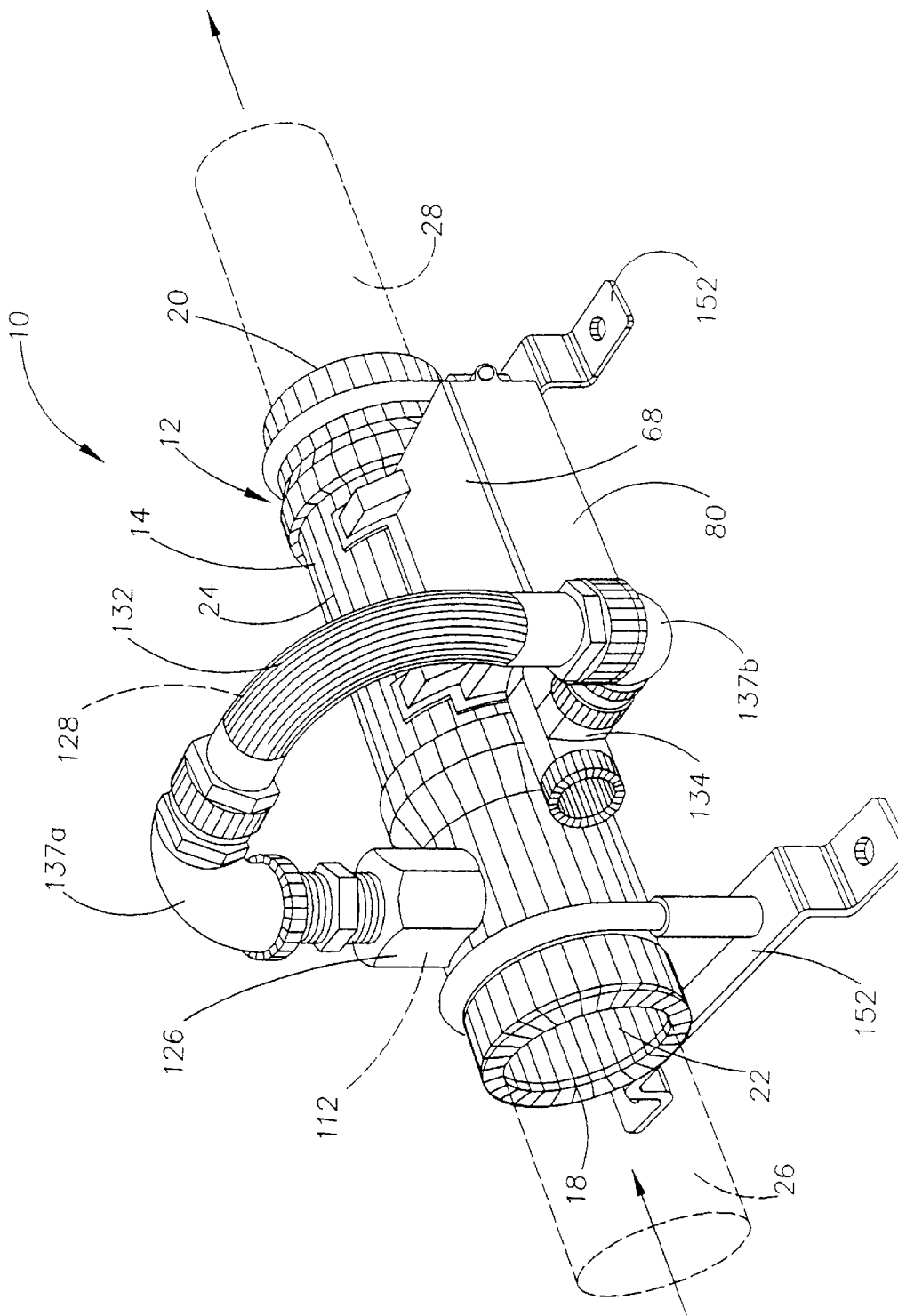
FIG. 2 is a perspective view of the flow meter and enclosure containing the signal conditioning circuit of the liquid measurement system of FIG. 1.
Figure 3:
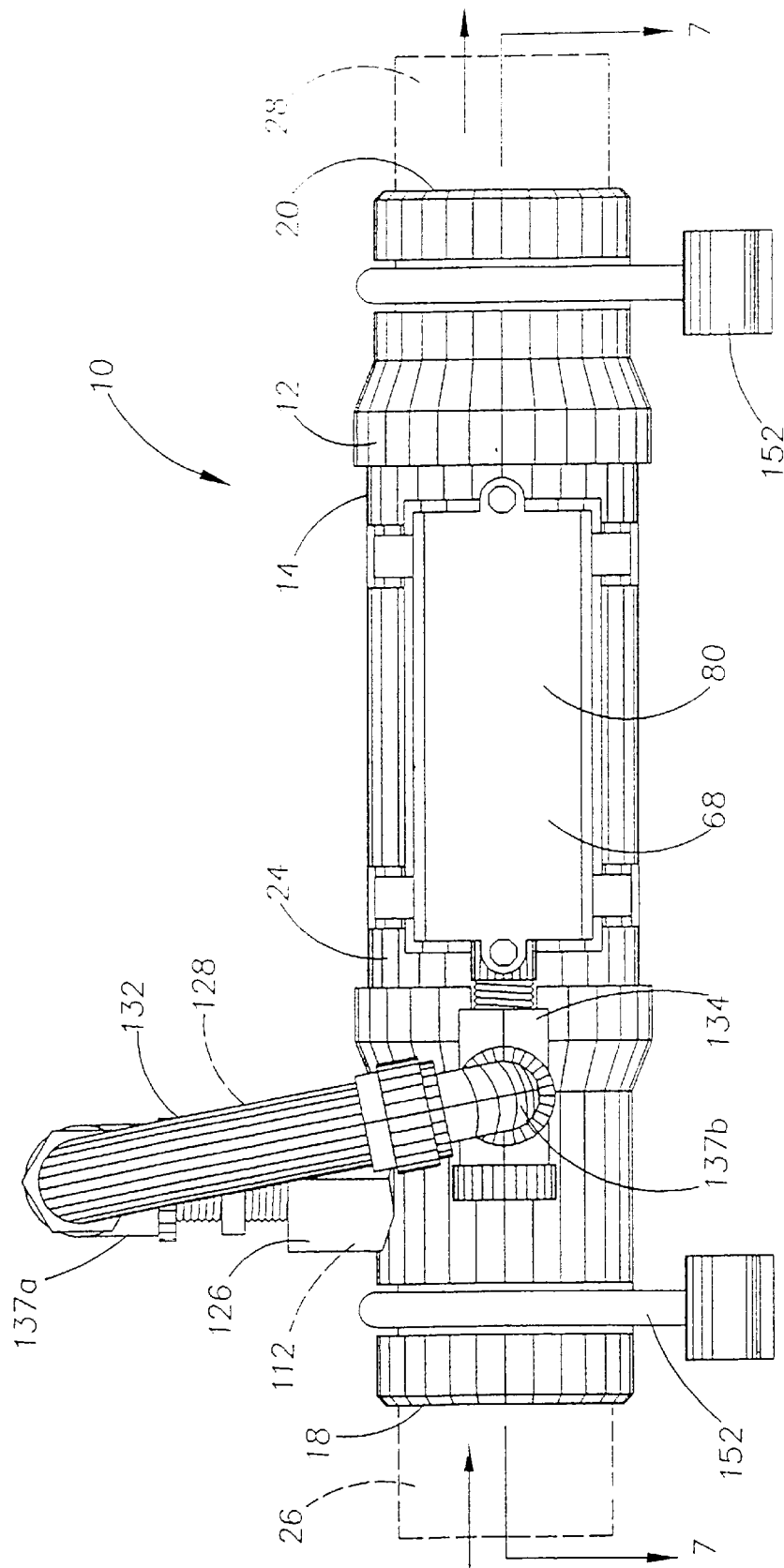
FIG. 3 is a side elevational plan view of the flow meter and electronics enclosure of FIG. 2.
Figure 4:
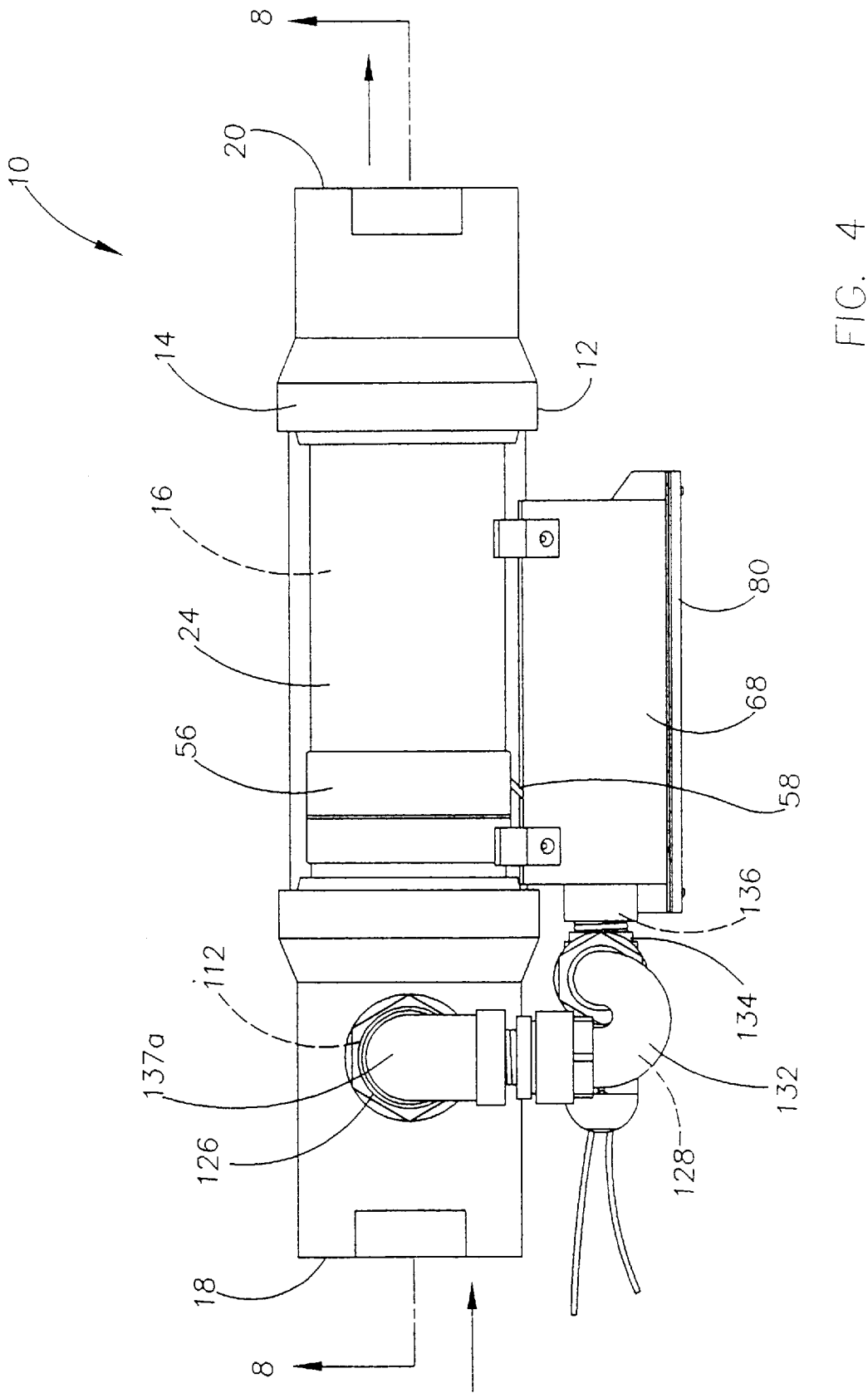
FIG. 4 is a top plan view of the flow meter and electronics enclosure of FIG. 2.
Figure 5:
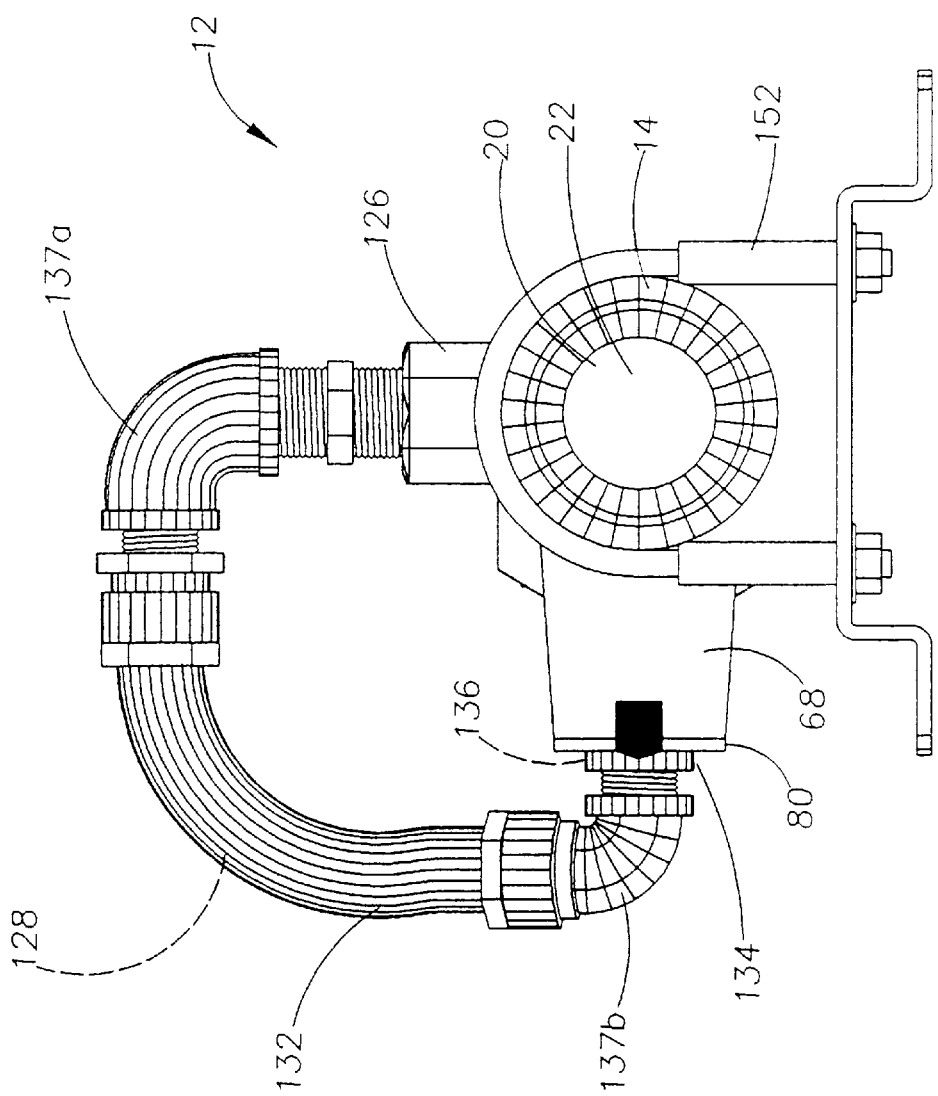
FIG. 5 is an end view of the flow meter and electronics enclosure FIG. 2.
Figure 6:
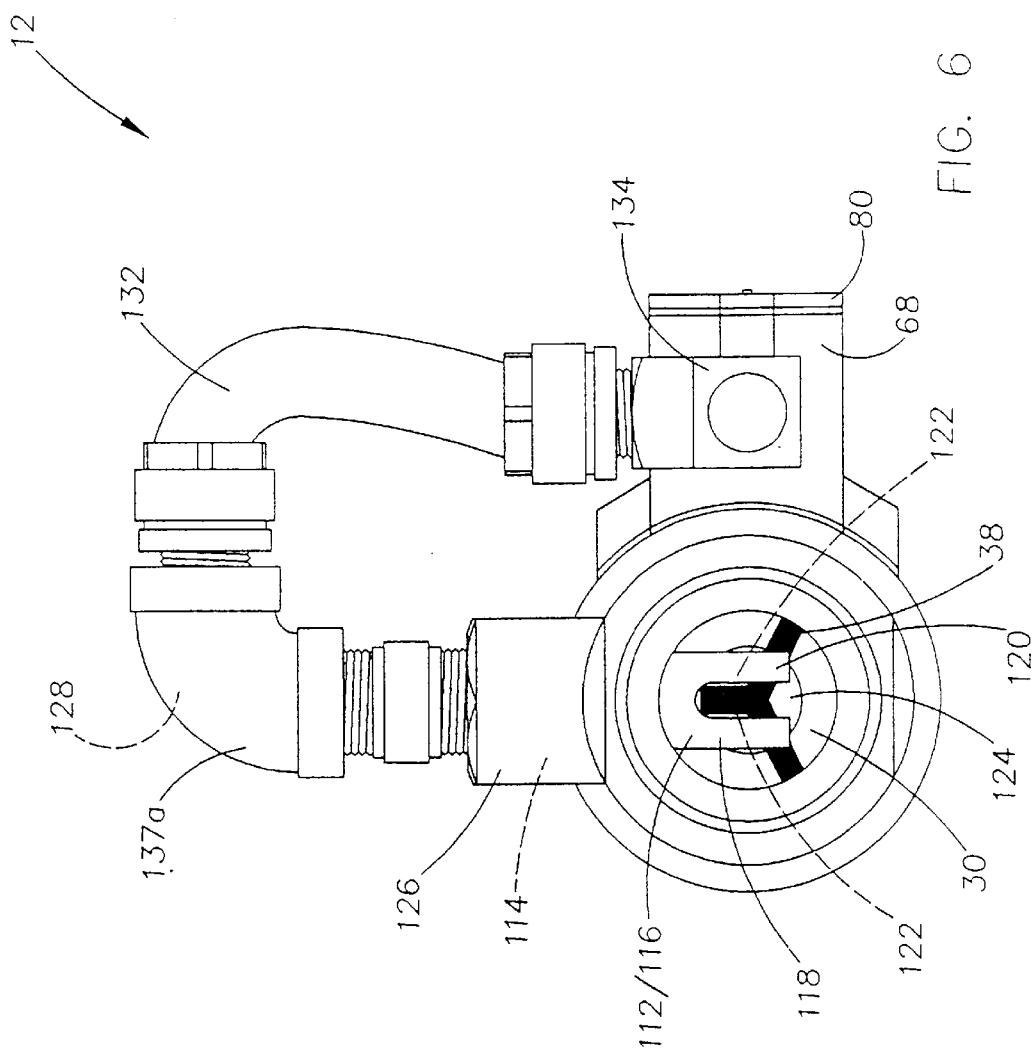
FIG. 6 is an end view of the flow meter and electronics enclosure of FIG. 2, showing the fluid sensor mounted in the passageway.

Referring now to the drawings, an embodiment of a liquid measurement system 10 according to the present invention is shown in FIG. 1. It is understood that the liquid measurement system 10 can incorporate a variety of flow meters to measure the rate of flow of a liquid from a containment structure to a receptacle or other desired location. For purposes of explanation, the operation of the liquid measurement system 10 using a specific flow meter is described herein. By the term "fluid," it is meant a gas, a liquid, or a combination of both. By the term "fluid sensor," it is meant a sensor that can sense the presence or absence of a liquid.

In general, as depicted in FIGS. 1–8, the liquid measurement system 10 includes a flow meter 12 for indicating/measuring the rate of flow of a fluid flowing therethrough. In a preferred embodiment, the flow meter 12 has a similar construction to the variable-area flow rate flow meter described in U.S. Pat. No. 4,986,133 (issued Jan. 22, 1991).

Figure 7:
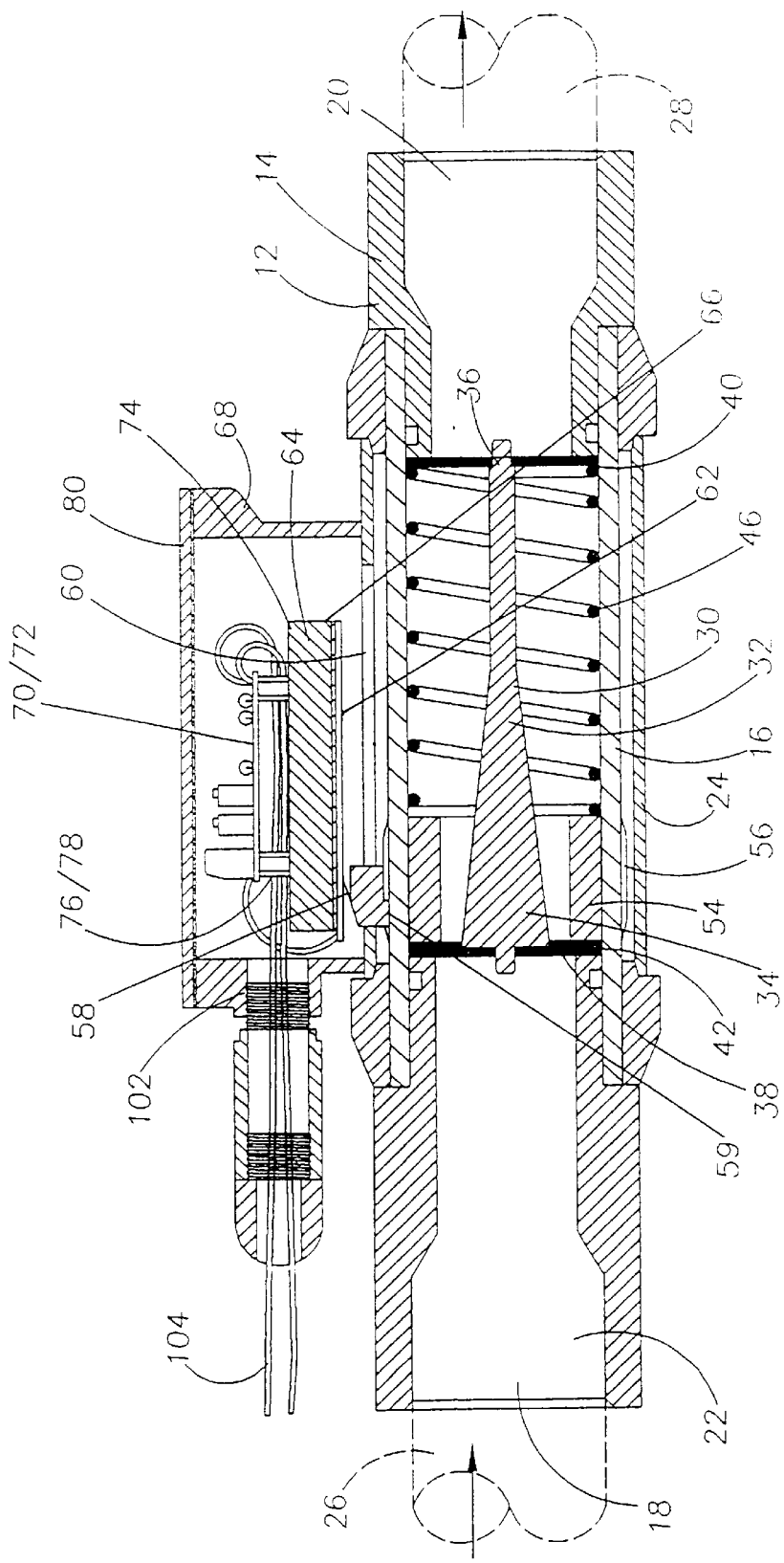
FIG. 7 is an elevational cross-sectional view of the flow meter and electronics enclosure of FIG. 3 taken along line 7—7, and showing the circuit board, and flow sensing member with the signaling element (follower) and attached wipers in contact with the resistive sensing element (linear potentiometer)
Figure 8:
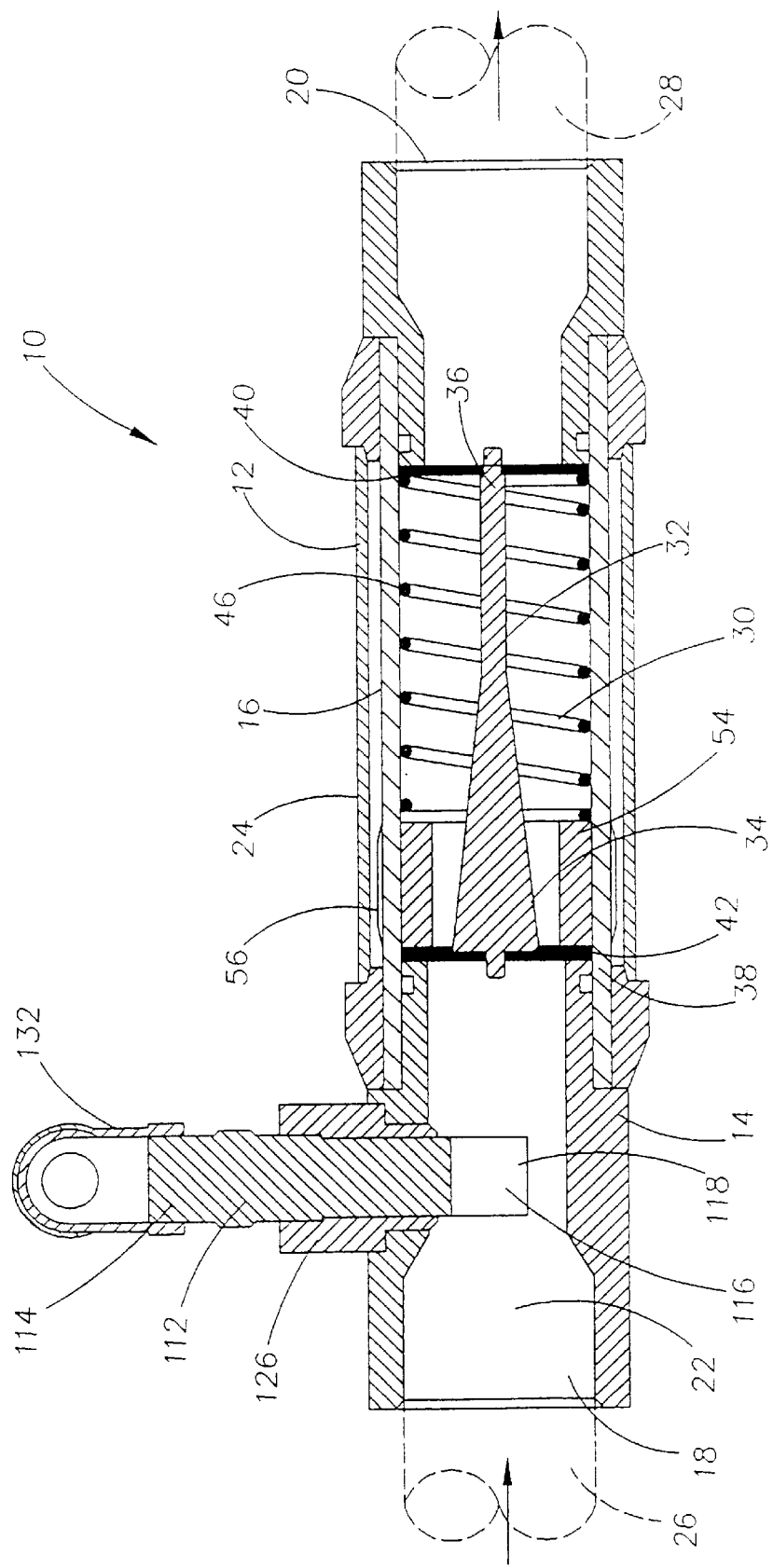
FIG. 8 is an elevational cross-sectional view of the flow meter of the liquid measurement system of FIG. 4 taken along line 8—8, and showing the flow sensing member, and the fluid sensor inserted in the passageway.

As best seen in FIGS. 7–8, the flow meter 12 is composed of a housing 14 that is a generally cylindrical inner tube 16 (i.e., thin-walled pressure vessel) composed, for example, of aluminum, brass, stainless steel or other similar material, with an inlet 18 and an outlet 20 for flow of the fluid through a passageway 22 extending therethrough. A second generally cylindrical outer tube 24 is supported exterior to the first inner tube 16 in a concentric, spaced relationship thereto. The inlet 18 and outlet 20 are adapted for coupling with fluid flow lines 26, 28 (shown in phantom).

Mounted within the passageway 22 of the flow meter 12 is a member 30 for sensing the flow of fluid. As illustrated, the flow sensing member 30 is an assembly composed of a tapered center shaft 32, or metering pin, having a first end 34 and a second end 36. The tapered center shaft 32 is supported at each end 34, 36 by an aperture plate or pilot disk 38, 40 and positioned generally concentric within the housing 14. A generally planar, sharp-edged orifice disk 42 or plate with a central aperture 44 is moveably mounted on the tapered center shaft 32. A compression spring 46 is confined within the first tube 16 mounted on the tapered center shaft 32, and arranged to urge the orifice disk 42 to ward the (inlet 18) of the housing 14 to a zero flow rate position in the absence of flow through the flow meter 12. The assembly 30 is held together and in place within the passageway 22 of the flow meter 12 by means of the two pilot disks 38, 40 mounted on either end of the assembly, which prevent the assembly from shifting during use.

Figure 9A:
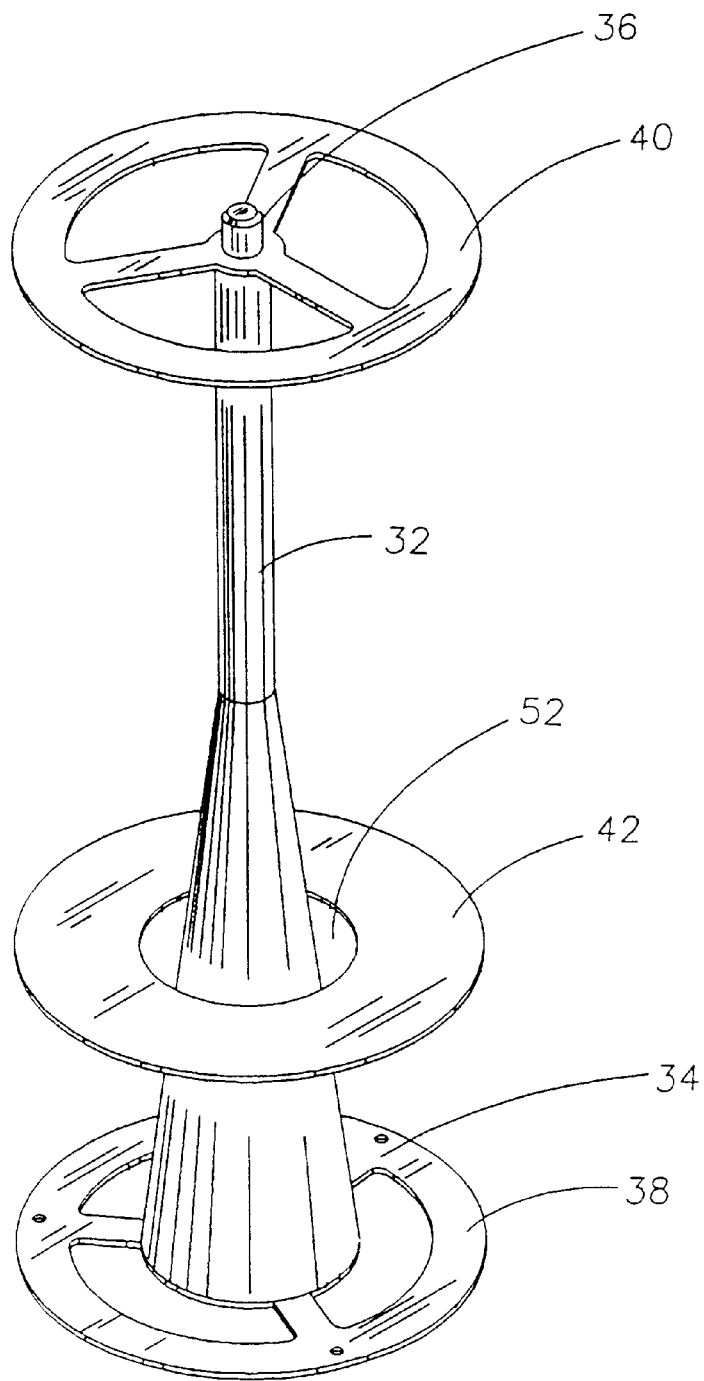
FIGS. 9A and 9B are a perspective view of the tapered center shaft and orifice disk of the flow sensing member of the flow meter of FIGS. 7–8.
Figure 9B:
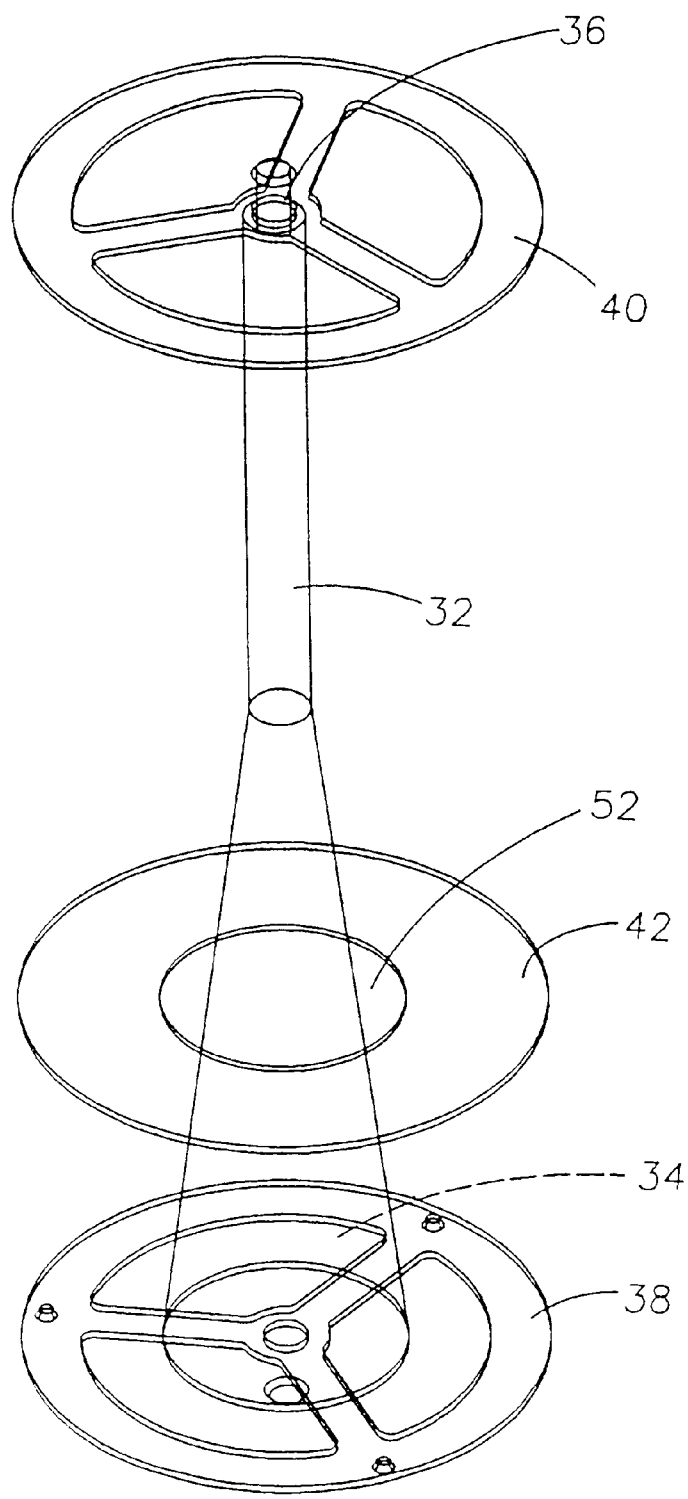

Fluid flowing through the passageway 22 exerts pressure against the orifice disk 42 causing the disk 42 to move against the spring 46 and along the tapered center shaft 32 toward the outlet end 20 of the housing 14. As best illustrated in FIGS. 9A and 9B, the fluid flows through the orifice area 52 adjacent to the tapered center shaft 32.

The flow meter 12 measures flow rate of a liquid or gas by relating linear displacement of the sharp-edged orifice disk 42 to a corresponding flow rate. As the orifice disk 42 moves toward the second end 36 of the tapered center shaft 32, the orifice area 52, through which the fluid flows, increases exponentially. Thus, the tapered center shaft 32 provides a variable-area annular orifice that increases by the square of the linear displacement of the orifice disk 42 along the shaft 32. The non-linear increase in the orifice area 52 compensates for a non-linear increase in pressure differential with respect to flow rate. The variable-area flow meter provides a very nearly linear relationship between flow rate and orifice displacement, thereby linearizing the scale.

An annular, generally cylindrical shaped magnetized sleeve 54 (e.g., ring magnet) is interposed between the spring 46 and the orifice disk 42. The sleeve 54 moves coincident with movement of the orifice disk 42.

Figure 11:
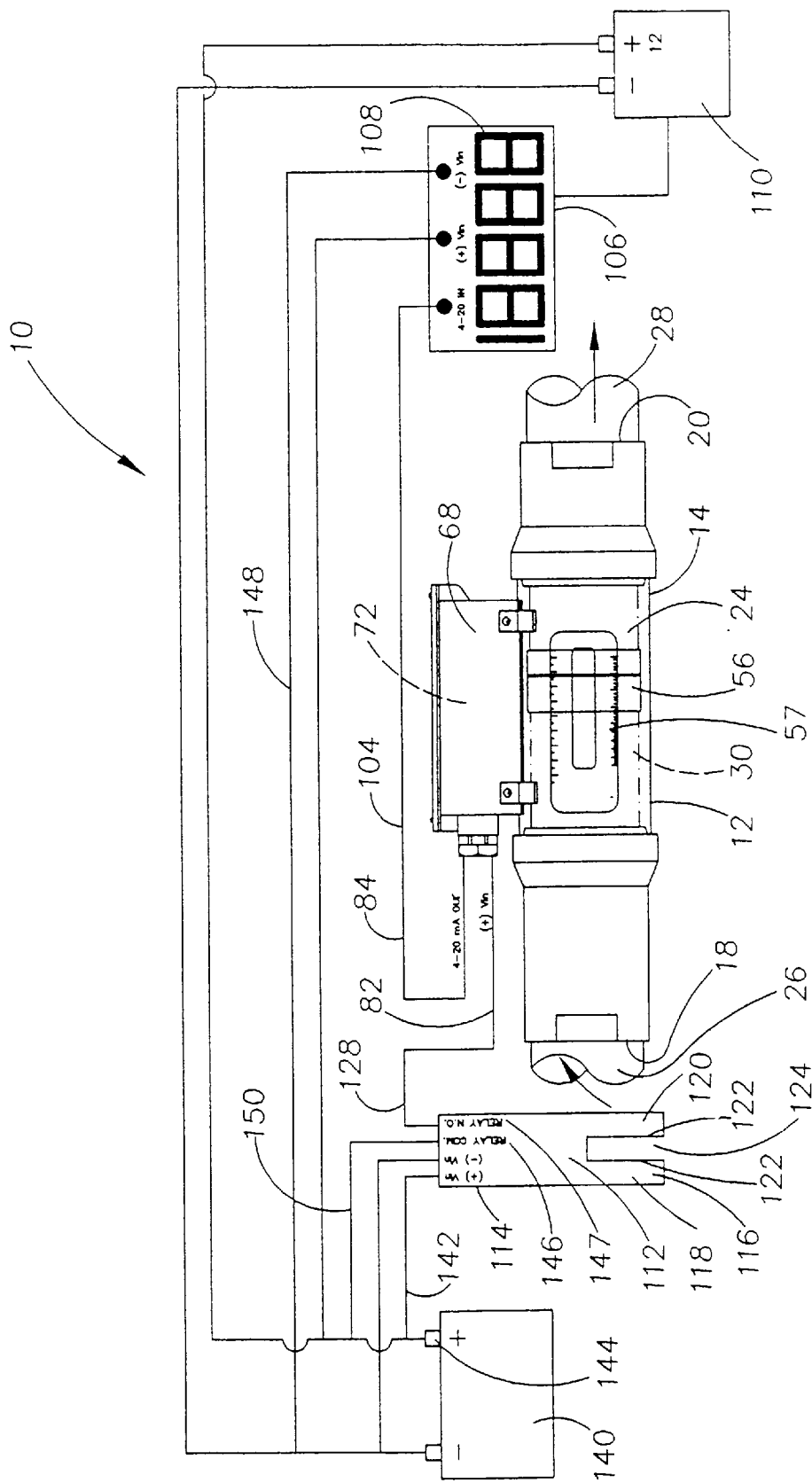
FIG. 11 is an electronic schematic view of the liquid measurement system of FIG. 1.

A signaling element 56 in the form of a follower composed at least partially of a magnetic material, is mounted adjacent the exterior of the inner tube 16 of the first housing 14 in a magnetically coupled relationship to the sleeve 54 to capture the motion of the orifice disk. The follower 56 is confined for movement between the first inner tube 16 and the second outer tube 24 of the housing 14. The follower 56 moves substantially coincident with movement of the sleeve 54. Flow rate can be read by aligning the follower 56 with a graduated scale 57 located on the outer tube 24, as shown in FIG. 11.

Referring to FIG. 7, attached to the follower 56 is one or more wipers, which extend through an opening 60 or longitudinal slot through the outer cylindrical tube 24. The wiper 58 is composed, for example, of gold-plated tin or beryllium copper, and placed in contact with a resistive sensing element 62 which is a linear potentiometer. In the illustrated embodiment, the resistive sensing element 62 is mounted on a first side 64 of a support surface 66 such as a plate made of a metal or PVC or other polymer material, and contained within an enclosure 68 mounted on the outer cylindrical tube 24 of the flow meter 12. The enclosure 68 can be composed of, for example, aluminum, brass, stainless steel or other similar material. As shown, it is preferred that the resistive sensing element 62 extends the length of the support surface 66.

Within the enclosure 68 is a circuit board 70 supporting a signal-conditioning circuit 72 and mounted on the second side 74 of the support surface 66. As shown, the circuit board 70 includes standoffs or posts 76 that will receive a fastener 78 such as a screw to mount the circuit board 70 onto the support surface 66. The enclosure 68 can be composed of a metal or polymer, and includes a removable cover 80 to gain access to the circuit board 70 and sensing element 62.

The signaling element (follower) 56 tracks the movement of the orifice disk 42, and the wiper 58 attached to the follower 56 slides along the resistive sensing element 62 as the follower 56 moves along. The position of the wiper causes the resistance value to change.

The resistive sensing element 62 of the signaling element 56 is electrically connected to or interfaced with, the signal-conditioning circuit 72. The resistive sensing element 62 is operable to sense linear displacement of the follower and convert the displacement to a changing resistance or proportional resistance (first signal 82) that is read in by the signal-conditioning circuit 72. The signal-conditioning circuit 72 converts the first signal 82 into a second 4–20 mA current output signal 84. The 4–20 mA output signal 84 is proportional to flow rate. An amplitude of about 4 mA is equivalent to no flow and an amplitude of about 20 mA is equivalent to a calibrated, pre-determined full scale value.

Figure 10:
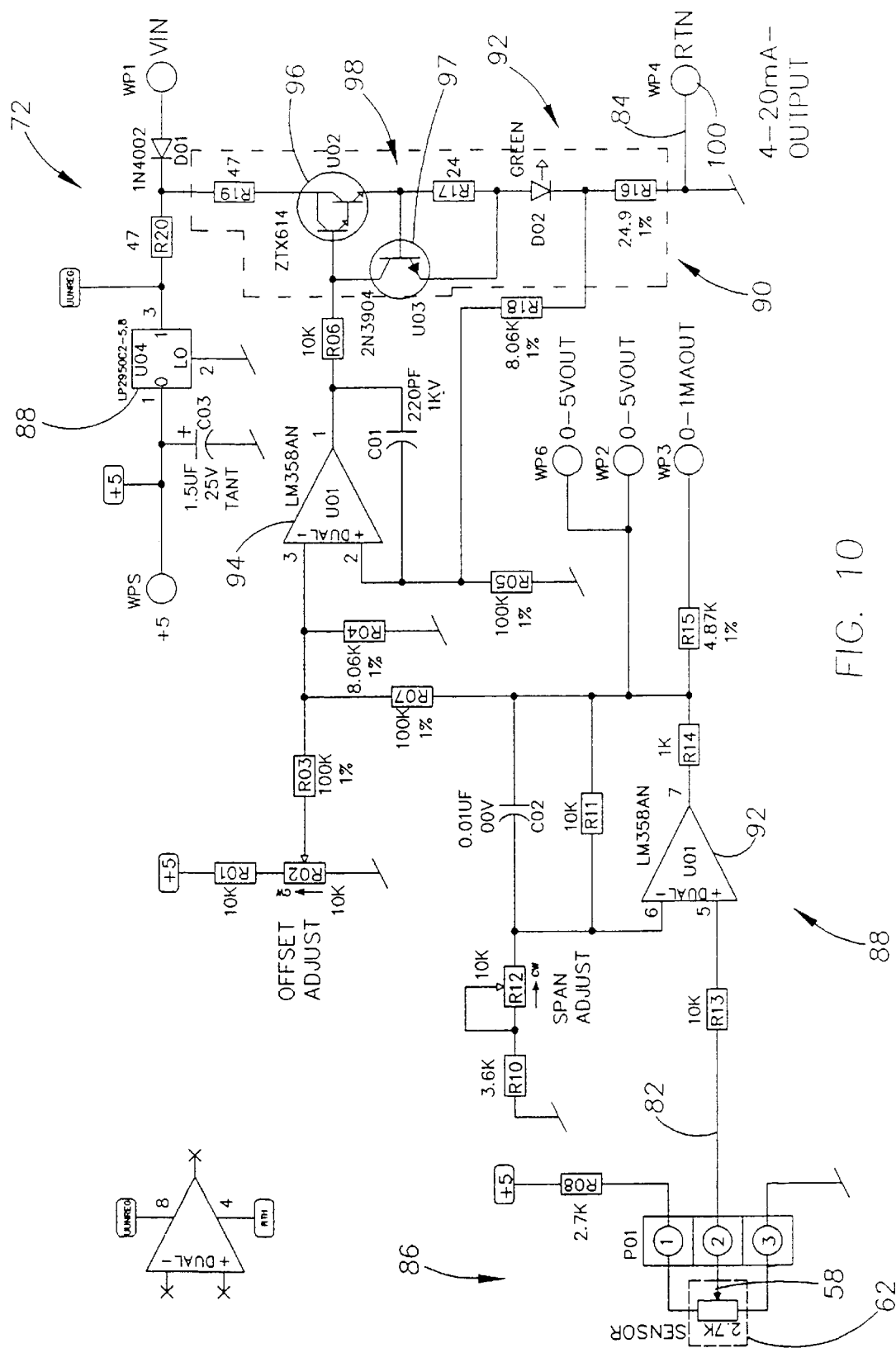
FIG. 10 is a detailed electronic schematic diagram of an embodiment of a signal-conditioning circuit of the liquid measurement system of FIG. 1.

FIG. 10 is a circuit diagram of a signal conditioning circuit 72 for use with the liquid measurement system 10. Preferred values for various components are shown on the drawing. The circuit includes four main functional sections, the operation of which is understood by those in the art. These sections include a voltage divider circuit 86 with which the resistive sensing element 62 interfaces, two op-amps 92, 94 configured for voltage-to-current conversion and gain adjustment, a voltage regulator 88 to provide a regulated 5-volt supply which is necessary in various locations throughout the circuit, and a current limiting circuit 90 composed of various transistor packages 96, 97.

The wiper 58 of the sensing element 62 is coupled to the non-inverting input of the first op-amp 92. Linear displacement of the wiper 58 causes changes in the resistance of the potentiometer 62 which in turn changes the balance of the voltage divider in such a manner as to vary the voltage seen by the non-inverting input of first op-amp 92 from a minimum of 0 volts to a maximum of 2.5 volts. The two op-amps 92, 94 then convert this varying voltage to a current output that is passed into the current limiting circuit 90. The two op-amp stages include potentiometers that allow the gain of each stage to be calibrated in such a manner that 4 mA will correspond to a predetermined wiper position representing no flow and 20 mA will correspond to a predetermined wiper position representing full-scale flow. Under normal operation, the current limiting circuit 90 will simply pass currents varying between 4 mA and 20 mA directly to the circuit's output. In situations where one of the op-amp stages is calibrated incorrectly or there is a short or open circuit in the sensing element 62 such that the gain of the op amps will make the current exceed 30 mA, the current limiting circuit 90 will begin operating. The normal operation of the current limiting circuit is to "clamp" currents exceeding 30 mA to a value of 30 mA.

The enclosure 68 containing the circuit board 70 and signal-conditioning circuit 72 includes an opening 102 for passage of an electric lead 104 therethrough from the signal-conditioning circuit 72 to a totalizing mechanism 106 such as a digital flow totalizer. The totalizer 106 functions to receive the signal 84, and process the signal to provide the accumulated total amount of fluid passing through the passageway 22. The totalizer is programmable according to the value to which the amplitude is equivalent, i.e., 4 mA equivalent zero flow, and 20 mA equivalent to a predetermined full scale value.

The totalizer 106 monitors time and reads in the signal 84, and then performs a calculation of time multiplied by rate. The totalizer provides a visual display 108 (electronic digital display) of the accumulated total amount of fluid that has flowed through the flow meter 12. Totalizers useful in the present system are commercially available. An example of a useful digital flow totalizer is the Supertrol-I multifunction flow totalizer, rate meter and batcher by Kessler-Ellis (Eatontown, N.J.). The totalizer 106 can be electrically connected to a printer 110 to provide a printed read-out of the flow rate. An example of a useful printer is the IMP-24 printer (Weigh-Tronix, Inc., Fairmont, Minn.).

To overcome the longstanding problem of erroneously measuring air flowing through the flow meter 12 rather than the actual liquid material, the flow meter 12 incorporates a fluid (liquid) sensor 112 in the form of an ultrasonic sensor having a sensing element 122 that can sense the presence or absence of liquid passing through the flow meter 12. The fluid (liquid) sensor 112 has a first end 114 and a second (probe) end 116, and is mounted through the housing 14 of the flow meter 12 with the probe end 116 disposed within the passageway 22. The probe end 116 of the fluid sensor 112 has two extensions or tines 118, 120, in which is mounted a piezoelectric sensing element 122. The sensing element 122 transmits a signal through the space or gap 124 between the first extension 118 and the second extension 120. Such fluid sensors are commercially available. A useful fluid sensor is the ultrasonic level sensor of the ULS-11 series level switch from IMO Gems, Plainfield, Conn.

The fluid sensor 112 is mounted to the flow meter 12 through a connecting member 126 such as a bushing. An electric lead 128 interconnects the first end 114 of the fluid sensor 112 to the signal-conditioning circuit 72. The lead 128 is passed through an adjoining protective, elbow-shaped sleeve 132 composed of a weather-proof, flexible elastomer material such as Tygon®, and a T-shaped connection joint 134 that is attached to the opening 136 of the enclosure 68 for the signal-conditioning circuit 72. An elbow joint 137a connects the flexible sleeve 132 to the connecting member (bushing) 126. An elbow joint 137b connects the flexible sleeve 132 to the T-joint 134. The lead 128 can be encapsulated in a potting compound or epoxy filler material, for example, Epic Resin X9GC2402 (Epic Resins, Palmyra, Wis.), for added protection against moisture.

The fluid sensor 112 is positioned at a depth in the passageway 22 of the housing 14 so that the gap 124 in the probe end 116 becomes filled with liquid when liquid flows through the meter, but not to unduly obstruct the passageway 22 so as to interfere with fluid flow through the meter. Although the fluid sensor 112 can be installed in the outlet 20 of the housing 14 following the flow sensing member 30, it is preferred that the fluid sensor 112 is positioned at the inlet 18 of the housing 14 to contact the fluid in advance of the flow sensing member 30.

As illustrated in FIG. 11, the system 10 is a closed current loop system that is powered by an electrical source 140 such as an automotive electrical system, namely, the battery of a car or truck. Electric leads 142 connect the electrical source 140 to the fluid sensor 112, which is connected to the signal conditioning circuit 72, as shown in FIGS. 1 and 11. The positive 144 of the battery 140 is connected along lead 150 to a relay common (COM) contact 146 in the fluid sensor 112. When the probe end 116 is substantially wet in that liquid material is present in the gap 124 to interrupt the signal transmitted between the two extensions 118, 120 of the fluid sensor 112, the normally open (N.O.) relay contact 147 closes and the positive voltage (12 volts) from the battery 140 goes through the relay contact 147 and into the input of the signal conditioning circuit 72. The circuit 72 receives the first signal 82 from the resistive sensing element 62 (linear potentiometer) and generates a 4–20 mA current output signal 84 proportional to the flow rate, which is sent to the totalizer 106, and back out a line 148 to the battery to complete the current loop. When the probe end 116 is substantially dry so that an uninterrupted signal 138 is transmitted from the first extension 118 to the second extension 120 through gap 124, there is an open circuit wherein the N.O. relay contact 147 is open and the voltage from the battery 140 is interrupted rather than traveling into the circuit 72. As a result, no current output signal 84 is sent by the signal-conditioning circuit 72 to the totalizer 108, so that the totalizing operation is paused. Although the fluid sensor 112 cuts out the signal to the totalizer, the system still provides a flow rate reading on the calibrated scale 57 on the sight tube.

In the use of the present system to measure the quantity of a transferred liquid material, the hoses 26, 28 are connected to the inlet and outlet ports 18, 20 of the flow meter 12 and, respectively, to the grease trap or other holding container (not shown), and the receptacle compartment of the truck or other receiving container (or desired location) (not shown). The flow meter 12 is a weather-tight construction having sealed, corrosion resistant housing 14 and enclosure 68. The flow meter 12 can be mounted within a shroud or housing (not shown) that is installed, for example, on the bumper of a truck. The housing helps protect the flow meter and electronics from exposure to rain, snow and other elements such as a powerwash operation to clean the vehicle. The flow meter 12 can be mounted within the housing (or directly onto the truck) by means of a U-bolt mounting bracket or other mounting member 152. The totalizer and printer 106, 110 can be placed within the cab of the truck.

A vacuum source (not shown) is activated, typically up to about 130–140 gpm, to draw the liquid material out of the holding container, and cause it to flow through the flow meter 12, and into the receiving container. Typically, at the start of the operation, there is air in the pipe 26 that is initially drawn through the flow meter 12. The flow of air causes the orifice disk 42 to move along the tapered center shaft 32 and the wiper 58 of the sleeve 54 to create a resistance against the resistive sensing element 62 to produce and send the first signal 82 to the signal-conditioning circuit 72. However, with no liquid present between the gap 124 of the extensions 118, 120 of the fluid sensor 112, the signal between the two extensions 118, 120 is uninterrupted, the relay contact in the fluid sensor 112 is open so that no power is supplied to the circuit 72 and no signal 84 is transmitted from the signal-conditioning circuit to the totalizer 106. Thus, air passing through the flow meter 12 is not measured.

After the initial air passes through the system, the vacuum will draw up liquid material which then contacts the sensing element 122 of the fluid sensor 112. Liquid in the gap 124 of probe end 116 interrupts the signal of the piezoelectric sensing element 122 between the two extensions 166, 118, closes the circuit so that power is supplied to the signal-conditioning circuit 72, which transmits 4–20 mA current output signal 84 to the totalizer 106, which proceeds to calculate the amount of liquid passing through the flow meter 12. This continues until the end of the liquid removal operation when the vacuum again draws up air, and the attendant finally switches off the vacuum. During the liquid removal operation, an obstruction can occur in the inlet hose 26, in which case, air will flow through the meter 12 until the obstruction is cleared. At the end of the operation (or in the case of an obstruction in the hose 26) when air passes through the flow meter, the signal is transmitted between the extensions 118, 120, which opens the circuit to interrupt the transmission so that no power is supplied to the signal-conditioning circuit 72, which interrupts the output signal 84 to the totalizer 106 and stops the totaling operation. In this way, the flow meter 12 is prevented from including air flow amounts in the accumulated total of material flowing through the system, and accurately measures the total amount of liquid that is removed or transferred using the system.

The flow meter 12 can be used to measure any flowable liquid material that is chemically compatible with the housing 14 and the components that come in contact with the liquid material. The liquid measurement system 10 is particularly useful for measuring grease and oil materials including, for example, heating oil and hydraulic oil, that are being reclaimed from a waste operation. Examples of other liquids that can be measured using the present system include, for example, water, hydraulic fluids, liquid sewage, petroleum products, pharmaceutical fluids, biological liquids, beverages such as soda and beer, industrial chemicals including caustic chemicals, water glycols and mineral spirits, and other liquid materials.

The invention has been described by reference to detailed examples and methodologies. These examples are not meant to limit the scope of the invention. Variations within the concepts of the invention are apparent to those skilled in the art. The disclosures of the cited references throughout the application are incorporated by reference herein.

What is claimed is:

1. A system for measuring liquid flow, comprising:
    a flow meter for indicating a flow rate of a fluid flowing therethrough; the flow meter having a housing composed of a generally cylindrical tube, the generally cylindrical tube having an inlet, an outlet, and a passageway extending between said inlet and outlet, a flow sensing member mounted within the passageway, and a signaling element mounted on the housing to provide a signal corresponding to the flow rate of the fluid;
    a signal-conditioning circuit connected to the signing element to receive said signal from the signaling element, and to convert said signal into a 4–20 mA output signal indicative of the flow rate of the fluid through the passageway;
    a flow totalizer connected to the signal-conditioning circuit and responsive to the output signal from the signal-conditioning circuit the flow totalizer processing the 4–20 mA output signal to an accumulated total of the fluid flowing through the passageway; and
    an ultrasonic fluid sensor having a first end and a second end, said sensor mounted through the housing with the second end disposed within the passageway and the first end connected to the signal-conditioning circuit; the second end of the ultrasonic fluid sensor sensing the liquid in the passageway and interrupting transmission of the 4–20 mA output signal from the signal-conditioning circuit to the totalizer when there is substantially no liquid present in the passageway.

2. The system of claim 1, wherein the second end of the ultrasonic fluid sensor includes a sensing element to sense the liquid in the passageway by contact with the liquid flowing through the passageway, the ultrasonic fluid sensor interrupting the 4–20 mA output signal from the signal-conditioning circuit when there is substantially no contact of the liquid with the sensing element of the ultrasonic fluid sensor.

3. The system of claim 1, wherein the fluid is selected from the group consisting of grease, heating oil, and hydraulic oil.

4. The system of claim 1, wherein the fluid is selected from the group consisting of water, hydraulic fluids, liquid sewage, petroleum products, pharmaceutical fluids, biological liquids, beverages, and industrial chemicals.

5. The system of claim 1, further comprising a printer electronically connected to the totalizer.

6. The system of claim 1, wherein said generally cylindrical tube comprises a generally cylindrical inner tube, and a generally cylindrical outer tube supported exterior the generally cylindrical inner tube in a concentric, spaced relationship thereto; and
    the flow sensing member is composed of a tapered center shaft having a first end and a second end mounted within the inner tube and supported at each end by an aperture plate and positioned generally concentric with the inner tube; a generally planar, sharp-edged orifice disk moveably mounted on the center shaft; and a spring mounted on the tapered center shaft and arranged to urge the orifice disk toward the inlet of the generally cylindrical tube; and when the liquid flows through the passageway, the orifice disk is displaced for a distance along the tapered center shaft toward the outlet of the generally cylindrical tube, said displacement distance corresponding to the flow rate of the fluid;

an annular generally cylindrical shaped magnetized sleeve interposed between the spring and the orifice disk for movement coincident with movement of the orifice disk; and the signaling element being a follower composed at least partially of a magnetic material being mounted adjacent to the inner tube in a magnetically coupled relationship to the sleeve, the follower moving substantially coincident with movement of the sleeve, and having at least one wiper to produce the signal upon contact with a resistive sensing element.

7. The system of claim 6, wherein the resisitive sensing element sensor is a linear potentiometer sensing linear displacement of the follower and converting the displacement to a proportional resistance which is read by the signal-conditioning circuit.

8. A system for measuring a flow of a grease material, comprising:

a flow meter for indicating a flow rate of a fluid flowing therethrough; the flow meter having a housing being a generally cylindrical inner tube with an inlet, an outlet, and a passageway extending between the inlet and the outlet, and a second generally cylindrical outer tube supported exterior to the inner tube in a concentric, spaced relationship thereto;

a flow sensing member composed of a tapered center shaft having a first end and a second end, supported at each end by an aperture plate and positioned generally concentric with the housing; a generally planar, sharp-edged orifice disk moveably mounted on the center shaft; and a spring for urging the orifice disk toward the inlet of the inner tube; and when the fluid flows through the passageway, the orifice disk is displaced for a distance along the tapered center shaft toward the outlet end of the inner tube, said displacement distance along the shaft corresponding to the flow of the fluid; and an annular generally cylindrical shaped magnetized sleeve interposed between the spring and the orifice disk for movement coincident with movement of the orifice disk; and a signaling element being a follower composed at least partially of a magnetic material and mounted adjacent to the inner tube in a magnetically coupled relationship to the sleeve, the follower moving substantially coincident with movement of the sleeve, and having at least one wiper to produce a signal upon contact with a resistive sensing element;

a signal-conditoning circuit connected to the signaling element to receive said signal from the signaling element, and convert said signal into a 4–20 mA output signal indicative of the flow rate of fluid through the passageway;

a digital flow totalizer connected to the signal-conditioning circuit and responsive to the 4–20 mA output signal from the signal-conditioning circuit, the totalizer processing the 4–20 mA output signal to an accumulated total of the amount of the fluid flowing through the passageway; and an ultrasonic sensor having a first end and a second end, said ultrasonic sensor mounted in the housing with the second end disposed within the passageway; the second end of the ultrasonic sensor including a sensing element sensing the grease material in the passageway by contact with the grease material flowing through the passageway;

wherein when the fluid flowing through the passageway is substantially a gaseous material and the sensing element of the ultrasonic fluid sensor is substantially dry, the ultrasonic fluid sensor interrupts transmission of the 4–20 mA output signal from the signal-conditioning circuit to the totalizer such that the gaseous material flowing through the passageway is not measured by the totalizer, and when the sensing element of the ultrasonic fluid sensor is substantially wet, the ultrasonic fluid sensor allows the transmission of the 4–20 mA output signal from the signal-conditioning circuit to the totalizer.

9. The system of claim 8 further including a mounting member on the housing, and said mounting member is mountable on a bumper of a truck.

10. A system for measuring a liquid flow, comprising:

a flow meter for indicating a flow rate of a fluid flowing therethrough; the flow meter having a housing with an inlet, an outlet and a passageway extending between the inlet and the outlet, a flow sensing member mounted within the passageway, and a signaling element mounted on the housing to provide a signal corresponding to the flow rate of the fluid;

a signal-conditioning circuit in communication with the signaling element to receive said signal from the signal element, and to convert said signal into an output signal indicative of the flow rate of the fluid through the passageway;

a flow totalizer in communication with the signal-conditioning circuit and responsive to the output signal from the signal-conditioning circuit, the flow totalizer processing the output signal to an accumulated total of the fluid flowing through the passageway of the housing; and an ultrasonic sensor having a first ends a second end, and a sensing element in the second end, the ultrasonic sensor mounted on the housing with the sensing element disposed within the passageway and the first end connected to the signal-conditioning circuit; the ultrasonic sensor interrupting transmission of the output signal from the signal-conditioning circuit to the totalizer when there is substantially no liquid present in the passageway.

11. The system according to claim 10, wherein when the sensing element of the ultrasonic sensor is substantially dry, the ultrasonic sensor interrupting the transmission of the output signal from the signal-conditoning circuit to the totalizer such that fluid flowing through the passageway is not measured by the totalizer; and when the sensing element of the ultrasonic sensor is substantially wet, the ultrasonic sensor allows the transmission of the output signal from the signal-conditioning circuit to the totalizer such that the liquid flowing through the passageway is measured by the totalizer.

12. The system of claim 10, wherein the fluid is a grease material.

* * * * *